US012540493B2

(12) United States Patent
Johansson

(10) Patent No.: US 12,540,493 B2
(45) Date of Patent: Feb. 3, 2026

(54) LOCKING ARRANGEMENT FOR DRAWERS IN A CABINET, A CABINET COMPRISING SUCH ARRANGEMENT AND A DRAWER RAIL

(71) Applicant: Inter IKEA Systems B.V., Delft (NL)

(72) Inventor: Tony Johansson, Asarum (SE)

(73) Assignee: Inter IKEA Systems B.V. (NL)

(*) Notice: Subject to any disclaimer, the term of this patent is extended or adjusted under 35 U.S.C. 154(b) by 73 days.

(21) Appl. No.: 18/277,058

(22) PCT Filed: Feb. 11, 2022

(86) PCT No.: PCT/SE2022/050151
§ 371 (c)(1),
(2) Date: Aug. 11, 2023

(87) PCT Pub. No.: WO2022/173359
PCT Pub. Date: Aug. 18, 2022

(65) Prior Publication Data

US 2025/0017371 A1 Jan. 16, 2025

(30) Foreign Application Priority Data

Feb. 12, 2021 (SE) .................................... 2150157-2

(51) Int. Cl.
*E05B 65/463* (2017.01)
*E05B 65/464* (2017.01)

(52) U.S. Cl.
CPC .......... *E05B 65/463* (2013.01); *E05B 65/464* (2013.01)

(58) Field of Classification Search
CPC .... E05B 65/462; E05B 65/463; E05B 65/464; A47B 88/50; A47B 2210/0086; A47B 2097/008
See application file for complete search history.

(56) References Cited

U.S. PATENT DOCUMENTS 3,900,236 A 8/1975 Goulish
4,768,844 A 9/1988 Ludwig
(Continued)

FOREIGN PATENT DOCUMENTS

AT 509331 A4 8/2011
CA 2389563 A1 12/2003
(Continued)

OTHER PUBLICATIONS

Translation EP1154107A2 (Year: 2001).*
(Continued)

*Primary Examiner* — Andrew Roersma
(74) *Attorney, Agent, or Firm* — Fishman Stewart PLLC

(57) ABSTRACT

A locking arrangement for a plurality of drawers in a cabinet may include (i) a drawer support arrangement associated with an associated drawer, (ii) a drawer locking arrangement, and (iii) an actuator associated with the associated drawer. The drawer support arrangement may include a drawer rail attached to the associated drawer and a guiding rail attached to the cabinet. The drawer rail may be movably received in the guiding rail such that the associated drawer is movable into and out of the cabinet. The drawer locking arrangement may include a plurality of locking members each configured to engage a respective drawer and that selectively allow only one drawer to be opened at a time. The actuator may include a driver configured to interact with an associated locking member that is associated with the associated drawer. The actuator may be supported by the drawer rail.

19 Claims, 8 Drawing Sheets

(56) References Cited

U.S. PATENT DOCUMENTS

| | | | | | |
|---|---|---|---|---|---|
| 4,872,734 | A * | 10/1989 | Rechberg | A47B 88/493 | 312/334.47 |
| 4,936,640 | A * | 6/1990 | Pratzer | E05B 65/464 | 312/221 |
| 4,966,423 | A | 10/1990 | Higuera | | |
| 5,056,877 | A * | 10/1991 | Westwinkel | E05B 65/464 | 312/217 |
| 5,567,027 | A | 10/1996 | McClung | | |
| 5,671,985 | A | 9/1997 | Grieser | | |
| 5,702,167 | A * | 12/1997 | Muller | E05B 65/464 | 312/217 |
| 5,961,193 | A * | 10/1999 | Hobbs | A47B 88/493 | 312/334.46 |
| 6,450,600 | B1 * | 9/2002 | Chen | A47B 88/493 | 312/334.46 |
| 2004/0100166 | A1 | 5/2004 | Hoffman | | |
| 2004/0130246 | A1 | 7/2004 | Dube | | |
| 2005/0017614 | A1 * | 1/2005 | Cirocco | A47B 88/49 | 312/333 |
| 2005/0040659 | A1 * | 2/2005 | Baker | E05B 65/463 | 292/338 |
| 2020/0405053 | A1 * | 12/2020 | Park | A47B 88/50 | |

FOREIGN PATENT DOCUMENTS

| | | | | |
|---|---|---|---|---|
| DE | 202013012111 | U1 * | 6/2015 | A47B 88/0407 |
| EP | 1154107 | A2 | 11/2001 | |
| EP | 3181785 | A1 | 6/2017 | |
| GB | 2336394 | A * | 10/1999 | E05B 65/464 |
| GB | 2429492 | A | 2/2007 | |
| JP | H074127 | A | 1/1995 | |

OTHER PUBLICATIONS

Translation EP3181785A1 (Year: 2017).*
English abstract for EP-3181785.
English abstract for EP-1154107.
1 Extended EP Search Report, EP22753070.6, dated Dec. 18, 2024.
Chinese Office Action and Search Report, CN202280014401.5, dated Oct. 30, 2025 (translation only).

* cited by examiner

LOCKING ARRANGEMENT FOR DRAWERS IN A CABINET, A CABINET COMPRISING SUCH ARRANGEMENT AND A DRAWER RAIL

CROSS-REFERENCE TO RELATED APPLICATIONS

This application claims priority to International Patent Application No. PCT/SE2022/050151, filed Feb. 11, 2022, and Swedish Patent Application No. SE 2150157-2, filed Feb. 12, 2021, the contents of both of which are hereby incorporated by reference in their entirety.

TECHNICAL FIELD

The present invention refers to a locking arrangement for drawers in a cabinet, a cabinet comprising such locking arrangement, and a drawer rail.

BACKGROUND

A cabinet is a classical piece of furniture to store items in homes and offices. The width and depth respectively of the cabinet is typically substantially smaller than the height. Thereby a large storing capacity is provided for while only requiring a limited footprint.

To increase storing capacity and to improve overview and access, the cabinet may contain drawers. Non-limiting examples are chest of drawers for domestic use, office furniture and file cabinets.

Each drawer defines a storing volume and as a drawer is opened, the centre of mass will be displaced. This is in most cases never a problem since the underlying working principle of a cabinet with drawers is to pull out drawers to get access to the contents. It is however never possible to foresee how a piece of furniture is used in practice and in the worst-case scenario, the cabinet may tip over and cause severe personal injuries. Typical risks are when the drawers at a higher level are filled with a heavy load and opened, when several drawers are open/opened at the same time or when a person is leaning over or seeks support against the cabinet or a pulled-out drawer. The latter may especially be the case when children are using the cabinet.

As a safety measure it is well known to use brackets of different types to fixate the cabinet against a wall to thereby safeguard against any tipping over. However, even though the cabinet is delivered with brackets and the manual explicitly prescribes that the brackets should be mounted before taking the cabinet into use, the user frequently decides not to mount the brackets.

One safety measure is to prevent that more than one drawer is opened at a time. One such solution is disclosed in U.S. Pat. No. 5,671,985 where a locking member is slidable received in a longitudinally extending track member which is arranged in a side wall portion of the chest. The locking member is provided with one set of guiding ramps per drawer, where each set of ramps are configured to interact with a locking projection which is supported by each drawer. As one drawer is pulled to be opened, the engagement between the locking projection of that specific drawer interacts with the corresponding set of guiding ramps on the locking member, thereby causing a longitudinal displacement of the locking member inside the track member. The displacement of the locking member prevents the other drawers from being opened unless the first drawer is closed.

Another locking system is disclosed in U.S. Pat. No. 4,768,844. In this locking system, each drawer is configured, via a respective pivotable cam mechanism, to cause a longitudinal displacement of a respective locking bar which is received in a common guiding channel in a wall portion of the chest. The displacement of the one or more locking bars cause a compression of a common spring which is received in a gap having a fixed length. The fixed length of the gap is chosen to allow the displacement of one locking bar which displacement is required to open one drawer and which displacement is the result of the pivoting of one single drawer's cam mechanism. The pivoting is caused by a side wall of each drawer comprising a projecting pin. Thereby only one drawer at the time may be opened. As a result of the fixed length of the gap, the system has an inherent mechanical restriction that prevents two or more drawers from being opened at the same time.

Yet another solution is disclosed in U.S. Pat. No. 5,671,985 which presents a drawer interlock assembly for a furniture article. The assembly includes at least first and second locking members slidingly mounted in the track member. The locking members are interconnected by at least one interconnection strip. Each of the locking members includes a locking projection. The assembly further includes at least first and second drawer members attached to the first and second drawers, respectively. Each of the drawer members includes a first ramp and a second ramp. Engagement of the locking projections with the first and second ramps allows only one drawer of the furniture article to be opened at a time.

The prior art solutions rely on each drawer having a pin which projects from a side wall thereof. This causes problems in production and handling. Since a cabinet typically comprises a plurality of drawers with different heights, a large number of article numbers is required during production and stock keeping. Also, the projecting pin has a negative impact on packing volume and the amount of packaging material required since it affects the possibility to provide flat, volume optimized packages.

There is accordingly a need to find a locking arrangement which meets the issues mentioned above.

SUMMARY

An object of the present invention is to provide a locking arrangement for drawers in a cabinet that at least partly overcome the drawbacks and risks mentioned above.

More precisely, the locking arrangement should have a design that makes it easy to use throughout the whole chain, from production, stock keeping, transportation and furniture assembly.

Yet another object is that the arrangement should be an integral part of the piece of furniture.

Additionally, the locking arrangement should be intuitive to the user.

These and other objects are provided for by a locking arrangement for drawers in a cabinet, the locking arrangement comprising a drawer support arrangement associated with each drawer, a drawer locking arrangement, and an actuator associated with each drawer; wherein each drawer support arrangement comprises a drawer rail attached to the drawer and a guiding rail attached to the cabinet, and wherein the drawer rail is movably received in the guiding rail, thereby allowing the drawer to be moved into and out of said cabinet;

the drawer locking arrangement comprises a plurality of locking members, each locking member being configured to engage an associated drawer, and wherein the plurality of locking members are directly or indirectly interconnected to each other to selectively allow only one drawer at a time to be opened;

said actuator comprises a driver configured to interact with an associated one of the plurality of locking members of the drawer locking arrangement; and wherein the actuator is supported by the drawer rail of the associated drawer.

Preferably, an upper edge portion of each locking member comprises a cam surface with a first cam portion and a second cam portion said cam portions being configured to interact with a longitudinally displaced pusher.

The pusher may form part of an associated locking rail.

Throughout the document the term "cabinet" is used. This term is intended to include any furniture of the type having drawers and where the centre of gravity may be changed during use by opening/closing the drawers. Non-limiting examples are a chest of drawers for domestic use, an office furniture and a file cabinet.

By the present invention, a locking arrangement for the drawers in a cabinet is provided. The provision of the locking arrangement is part of a safety arrangement of the type that allows only one drawer at a time to be selectively opened. The underlying purpose is to better control the inevitable change of centre of gravity as drawers are opened. Thereby a tipping-over prevention is provided.

The locking arrangement has a simple and highly intuitive design which ensures that the locking arrangement is automatically working in a correct manner directly when the one or more drawers are inserted in the cabinet during installation. Especially, since the actuator with its driver is supported by the drawer rail of the associated drawer, the actuator may be provided as an integral part of the drawer rail. Thus, the actuator will be automatically and correctly mounted together with the drawer rail. The drawer rail, and hence the actuator may even be provided as a component which is pre-mounted to the drawer. In the latter case, there are no separate parts or manuals which refer to the installation of the locking arrangement that require any tools, hands-on work or reading and/or understanding by the person installing the cabinet.

As a yet another important factor, in the event the cabinet and its drawers is of the type which is provided as one or more flat packages with parts to be assembled by the user, the wall parts of the drawers may all be provided in flat packages since the actuator with its driver is not part of the drawer but instead part of the drawer rail. This allows a reduced amount of packaging material and transport volume.

Additionally, by the actuator being supported by the drawer rail, it is made possible to reduce the number of parts and hence part numbers in a business system. This reduces cost and facilitates the logistic chain from design, manufacturing, stock keeping, packing and assembly. A typical cabinet comprises at least two and often more than two drawers, where the individual drawers in a cabinet may have different heights or even widths. Thus, even if one and the same single component as such may be part of different types of cabinets and drawers, drawers of different types and of different sizes, different part numbers are required.

The drawer support arrangement which forms part of the locking arrangement comprises a drawer rail which is attached to the drawer and a guiding rail which is attached to the cabinet, and wherein the drawer rail is movably received in the guiding rail, thereby allowing the drawer to be moved into and out of said cabinet. There are numerous prior art drawer support arrangements of this type. The drawer locking arrangement may by way of example be based on wheels, rollers or balls in order to reduce the friction between drawer rail and the guiding rail. It is also known to provide cooperating surfaces of the drawer rail and the guiding rail with a low-friction material such as a polymeric material. The actuator according to the invention is applicable no matter type of drawer support arrangement.

Further, the drawer support arrangement may be of the type where the drawer rail is arranged at least partly received in a recess of the drawer. Depending on the design, the drawer rail may thereby be arranged substantially in flush with its associated side wall of the drawer or only project partly.

The actuator may be attached to the drawer rail. The attachment may, as non-limiting examples be made by bolting, riveting, moulding, co-moulding, adhesive or welding. The choice of attachment depends on the material in the actuator and the drawer rail. The actuator is preferably fixedly attached to the drawer rail.

The actuator and drawer rail may be provided as a single pre-assembled unit. This is advantageous in the event the cabinet is intended to be assembled by the user.

Since the actuator and its driver may be provided as an integral part of the drawer rail which as such is mounted to the drawer, the risk of losing relevant parts over time, such as during a move, is reduced. The cabinet will thereby maintain its tipping-over prevention feature and allow it to be fully used also on the second-hand market. Further, its operation is very intuitive, whereby the need for a user manual is reduced/eliminated.

The locking members may be pivotable. In alternative embodiments, the locking members may be slidable or hinged.

The actuator may be arranged between the drawer rail and an outer side wall portion of the drawer. Thereby the actuator does not interfere with the operative engagement between the drawer rail and the guiding rail.

The actuator may be a body having a first portion configured to abut the outer side wall portion of the drawer and a second portion forming an angle to the outer wall portion of the drawer. The body may be arranged as a thin walled member.

By the angle, the engagement between the driver of the actuator may, depending of the specific structural design of the locking arrangement, be facilitated in the event the locking member of the drawer locking arrangement, when the drawer is to be mounted to the cabinet, should be set into it's position in which it during normal operation is intended to lockingly engage the driver of the actuator. Thus, by the angle, the drawer is allowed to be inserted and hence over-ride any incorrect position of the locking member.

The angle as seen between the outer side wall portion of the drawer and the second portion of the actuator may be in the range of 5-40 degrees and more preferred in the range of 10-30 degrees.

The driver may be supported by the second portion of the actuator.

The driver may be displaced in view of a longitudinal centre line of the actuator.

It is generally advantageous to arrange the drawer locking arrangement in the rear end of the cabinet close to the back wall thereof. Such position makes it less visible to the user. Also, such position protects the drawer locking arrangement from any accidental interference with the contents in the cabinet and also hides the same from children. By displacing the driver from the longitudinal centre line, the drawer locking arrangement is allowed to be positioned closer to the rear wall of the cabinet while at the same time the available connecting surface between the drawer rail and the lower end of the actuator is not compromised. This ensures a robust support of the actuator.

A free end portion of the driver may comprise a bevelled edge portion configured to face a rear wall of the cabinet.

The bevelled edge may further facilitate the initial insertion of the drawer in the event the locking member of the drawer locking arrangement should be set into it's position in which it during normal operation is intended to lockingly engage the driver of the actuator.

In an alternative embodiment, the actuator may comprise a body which is arranged between the drawer and the drawer rail or inside the drawer rail, and wherein the driver has an axial extension allowing a free end of the driver to extend through a hole in the drawer rail and into engagement with an associated locking member of the drawer locking arrangement.

In such embodiment, the only visual part of the actuator will be the driver. The body of the actuator will be concealed inside the drawer rail or concealed between the drawer and the drawer rail. The actuator with its driver may be provided as an integral part of the drawer rail which facilitates mounting and over all handling. Also, the cabinet will automatically work as intended as the drawer is installed.

The driver may be elastically biased in its axial direction. The biasing may be provided by the driver being biased by a spring towards a fully projected position. The biasing may facilitate the initial insertion of the drawer in the event the locking member of the drawer locking arrangement should be set into it's position in which it during normal operation is intended to lockingly engage the driver of the actuator.

The drawer locking arrangement may further comprise: a locking rail adapted to be mounted to an inner side wall portion the cabinet, said locking rail being configured to directly or indirectly receive a plurality of locking rods, and to allow the plurality of locking rods to be displaced along the longitudinal extension of the locking rail as a result of a setting of a locking member; and a stop member configured to restrict displacement of the plurality of locking rods such that only one drawer at a time may be opened.

The locking rail may at least partly be received in a groove formed in the inner side wall of the cabinet. Alternatively, the locking rail may be received in a support rail which is arranged on the inner side wall of the cabinet. Such support rail may be either countersunk or be arranged on the surface of the side wall. No matter design, the locking rail is preferably mounted to extend in the vertical direction.

The guiding rail which forms part of the drawer support arrangement may be arranged on top of and across the locking rail of the drawer locking arrangement. Thereby a robust mounting of the drawer locking arrangement is provided for. Also, this makes it more difficult for the user of the cabinet to actively on her own volition remove the drawer locking arrangement.

Each drawer may be supported by two pairs of drawer and guiding rails with one pair arranged in each of the two opposing side walls of the cabinet. One of said pairs may be arranged on top of and across the guiding rail of the drawer locking arrangement. Thereby a robust mounting of the drawer locking arrangement is provided for. Also, this makes it more difficult for the user of the cabinet to actively on her own volition remove the drawer locking arrangement.

It is to be understood that it is sufficient that only one drawer rail in the two pairs is provided with an actuator.

According to another aspect, a cabinet comprising a locking arrangement according to any of the claims given above is provided.

The locking arrangement has been thoroughly discussed above and the features and advantages are equally applicable to a cabinet using such arrangement. To avoid undue repetition, reference is given to the sections given above discussing the locking arrangement.

According to yet another aspect, a drawer rail forming part of a drawer support arrangement is provided, wherein said drawer rail is configured to be movably received in a guiding rail, thereby allowing a drawer using such drawer rail to be moved into and out of a cabinet; and wherein the drawer rail comprises an actuator with a driver configured to interact with a locking member of a drawer locking arrangement.

Further objects and advantages of the present invention will be obvious to a person skilled in the art reading the detailed description given below describing different embodiments.

BRIEF DESCRIPTION OF THE DRAWINGS

The invention will be described in detail with reference to the schematic drawings.

DETAILED DESCRIPTION

Figure 1:
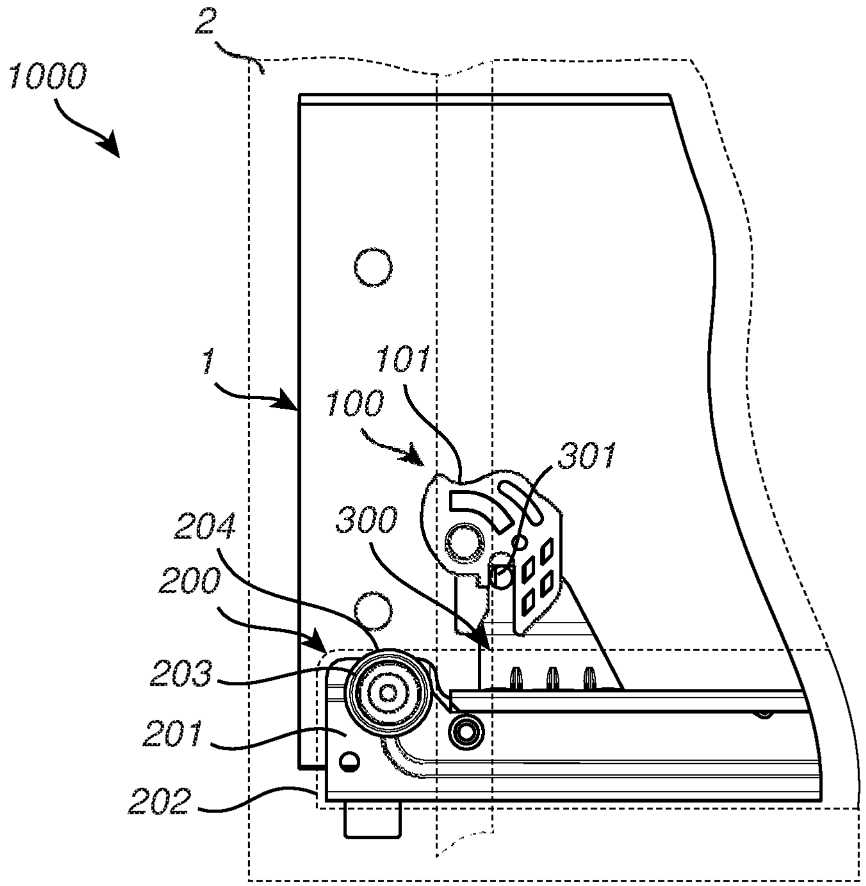
FIG. 1 discloses a schematic overview of the locking arrangement.

As a general overview before going into the details of the locking arrangement 1000 according to the invention, reference is made to FIG. 1 which discloses a schematic side view of the rear end of a drawer 1. To facilitate the understanding, only a portion of the cabinet 2 is disclosed highly schematically, and further a side wall forming part of the cabinet 2 has been removed. Further, only one single drawer 1 of the cabinet 2 is disclosed although it is to be understood that a cabinet 2 typically contains a plurality of drawers 1.

As its major components, the locking arrangement 1000 comprises a drawer locking arrangement 100, a drawer support arrangement 200 associated with each drawer 1 in the cabinet 2, and an actuator 300 associated with each drawer 1 of the cabinet 2.

Each drawer support arrangement 200 comprises a drawer rail 201 which is attached to the drawer 1 and a guiding rail 202 which is attached to the cabinet 2. Only a portion of the drawer rail 201 and the guiding rail 202 is disclosed. Further, the guiding rail 202 is highly schematically disclosed. The drawer rail 201 is movably received in and supported by the guiding rail 202, thereby allowing the drawer 1 to be moved into and out of said cabinet 2.

The disclosed drawer support arrangement 200 is of the type using wheels 203 to a support and guide the drawer 1 during opening and closing. The wheel 203 of the drawer rail 201 is configured to roll against an inner support surface 204 of the guiding rail 202, whereas the guiding rail 202 comprises a wheel (not disclosed) which is configured to roll against an inner support surface (not disclosed) of the drawer rail 201. The same function may be achieved by replacing the wheel(s) with rollers or balls in order of reducing friction between the drawer rail 201 and the guiding rail 202. It is also known in the art to provide cooperating surfaces of the drawer rail 201 and the guiding rail 202 with a low-friction material such as a polymeric material. It is to be stressed that the invention is applicable no matter design of and the type of the drawer support arrangement 200.

The drawer locking arrangement 100 comprises a plurality of pivotable locking members 101, each locking member 101 being configured to engage the actuator 300 of an associated drawer 1. Only one locking member 101 is disclosed in FIG. 1.

The actuator 300 is supported by the drawer rail 201 of the associated drawer 1. Each actuator 300 comprises a driver 301 which is configured to interact with an associated locking member 101 of the drawer locking arrangement 100.

The individual parts of the locking arrangement 1000 and their interaction will be discussed below.

Figure 2:
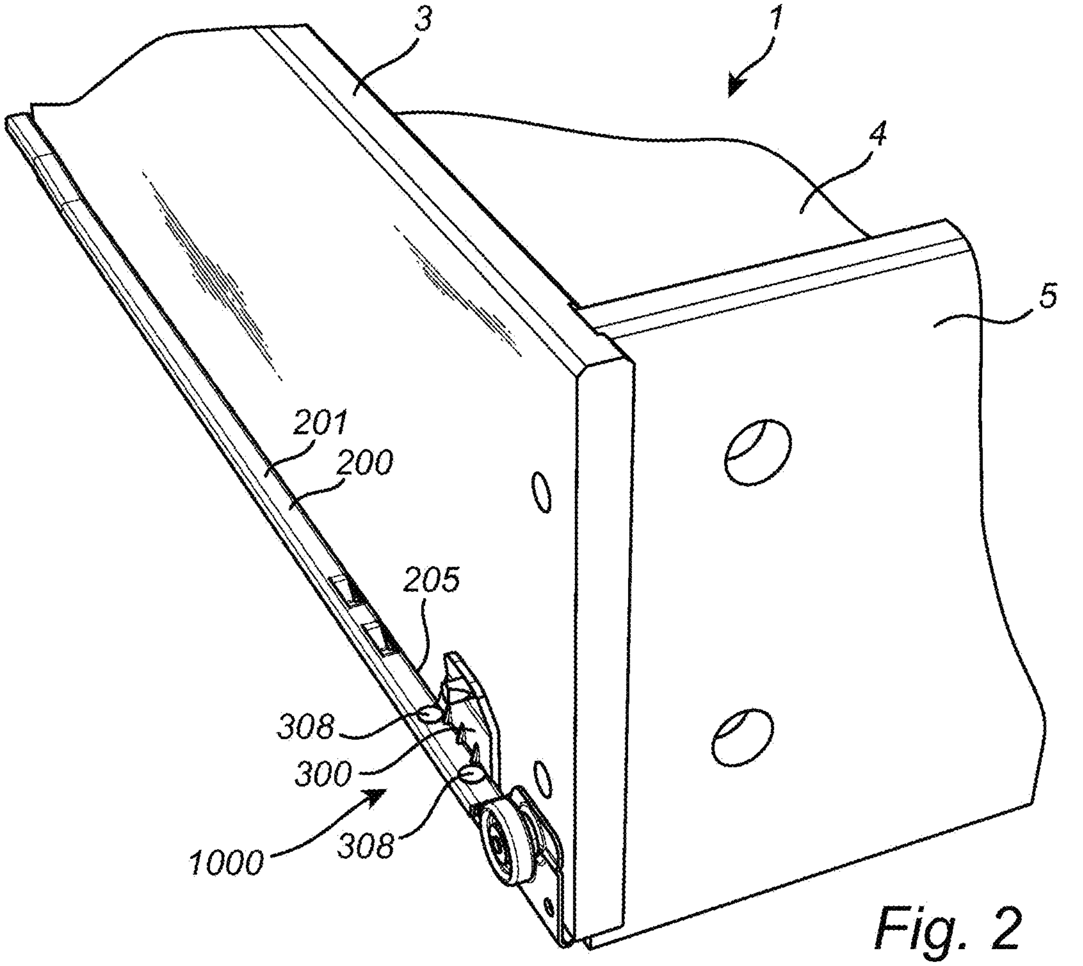
FIG. 2 discloses a portion of a drawer supporting a drawer rail and an actuator.

Now turning to FIG. 2, a perspective view of a rear corner portion of a drawer 1 is disclosed. The drawer 1 comprises a two opposing side walls 3 (only one is disclosed in FIG. 1). Further, the drawer 1 comprises a bottom wall 4, a rear side wall 5 and a non-disclosed front wall.

Each of the two opposing side walls 3 supports a drawer rail 201. The drawer rail 201 is part of the drawer support arrangement 200. As given above, the drawer rail 201 is configured to be movably received in a guiding rail (not disclosed in FIG. 2), thereby allowing the drawer 1 to be moved into and out of the cabinet. This is well known in the art and is not further explained.

The actuator 300 which is part of the locking arrangement 1000 is supported by the drawer rail 201. The actuator 300 is attached to the drawer rail 201. The attachment may, as a number of non-limiting examples, be made by bolting, riveting, moulding, co-moulding, adhesive bonding or welding. The choice of attachment depends on the material in the actuator 300 and the drawer rail 201 respectively. The actuator 300 is preferably fixedly attached to the drawer rail 201. It is however to be understood that the actuator 300 with remained function may be clamped between the side wall 3 of the drawer 1 and the drawer rail 201.

The actuator 300 and drawer rail 201 may be provided as a pre-assembled unit.

Although the drawer 1 is provided with two drawer rails 201, it is sufficient that only one of them is provided with an actuator 300.

Figure 3A:
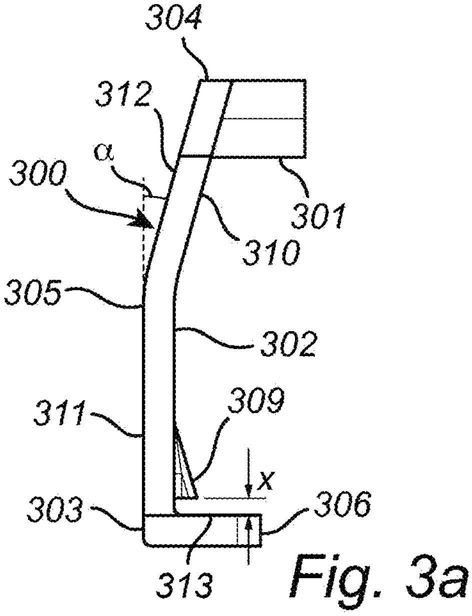
FIG. 3*a* discloses a side view of one embodiment of an actuator.
Figure 3B:
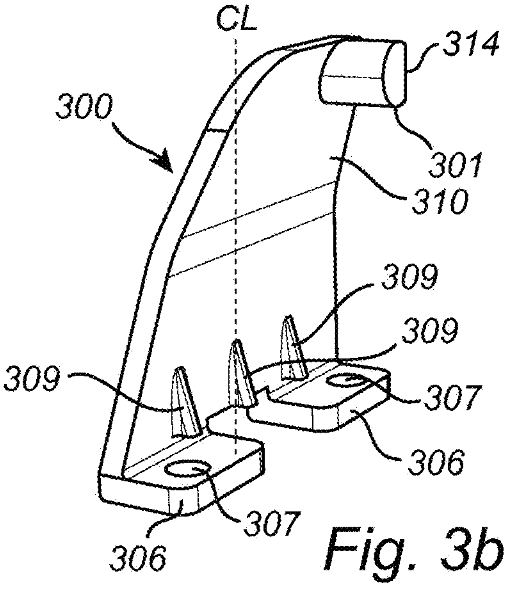
FIG. 3*b* discloses a perspective view of one embodiment of an actuator.

Now turning to FIGS. 3*a* and 3*b*, a side view and a perspective view of one embodiment of the actuator 300 is disclosed.

The actuator 300 comprises a body 302 in the form of a thin-walled member having a lower end 303 and an upper end 304 and an intermediate waist portion 305 extending between the lower end 303 and the upper end 304. The lower end 303 comprises two flanges 306. Each flange 306 comprises a through hole 307 configured to receive a fastener 308 such as a bolt, rivet, screw or the like for fixating the actuator 300 to the drawer rail 201, see FIG. 2. The skilled person realizes that the number of fixation points may be altered and also that the actuator 300 may be attached to the drawer rail 201 in other ways. Thus, the number of flanges 306 may be one or more.

The lower end 303 of the actuator 300 further comprises three shoulders 309. A gap X is formed between each shoulder 309 and an upper surface 313 of the respective flange 306. The gap X is configured to facilitate positioning of the actuator 300 in view of the drawer rail 201 before fixating the actuator 300 to the drawer rail 201. A flanged portion 205 of the drawer rail 201, see FIG. 2 is configured to be received in said gap X.

The upper end 304 of the actuator 300 comprises a driver 301. The driver 301 is formed as a pin projecting away from an outer surface 310 of the actuator 300. Thus, the pin 301 will in use point away from the drawer 1. The driver 301 is configured to interact with one associated locking member 101 of the plurality of locking members 101 of the drawer locking arrangement 100 in a manner to be discussed below.

The waist portion 305 of the actuator 300 is disclosed as having a first portion 311 configured to abut an outer side wall portion of the drawer 1 and a second portion 312 forming an angle α to the outer side wall portion of the drawer 1. The angle α as seen between the outer side wall portion of the drawer 1 and the second portion 312 of the actuator 300 may be in the range of 5-40 degrees and more preferred in the range of 10-30 degrees. By the angle, the engagement between the driver 301 of the actuator 300 may, depending of the specific structural design of the locking arrangement 1000, be facilitated in the event the pivotable locking member 101 of the drawer locking arrangement 100, when the drawer 1 is to be initially mounted to the cabinet 2, should be pivoted into its position in which it during normal operation is intended to lockingly engage the driver 301 of the actuator 300.

The skilled person realizes that the waist portion 305 of the actuator 300 may be provided as a flat portion without any angle.

As is best seen in FIG. 3*b*, the driver 301 is disclosed as being displaced in view of a longitudinal centre line CL of the actuator 300. By displacing the driver 301 from the longitudinal centre line CL, the drawer locking arrangement 100 is allowed to be positioned closer to a rear wall of the cabinet while at the same time the available connecting surface between the drawer rail 201 and the lower end 303 of the actuator is not compromised. It is advantageous to arrange the drawer locking arrangement 100 in the rear end of the cabinet 2 close to the back wall thereof. Such position makes it less visible to the user. Also, such position protects the drawer locking arrangement 100 from any accidental interference with the contents in the cabinet and also hides the same from children. The skilled person realizes that the driver 301 with remained function may be aligned with the longitudinal centre line CL of the actuator 300.

The actuator 300 may be provided by as a unitary body formed by e.g. injection moulding a plastic material. The actuator 300 may alternatively be formed by stamped sheet metal.

Figure 4A:
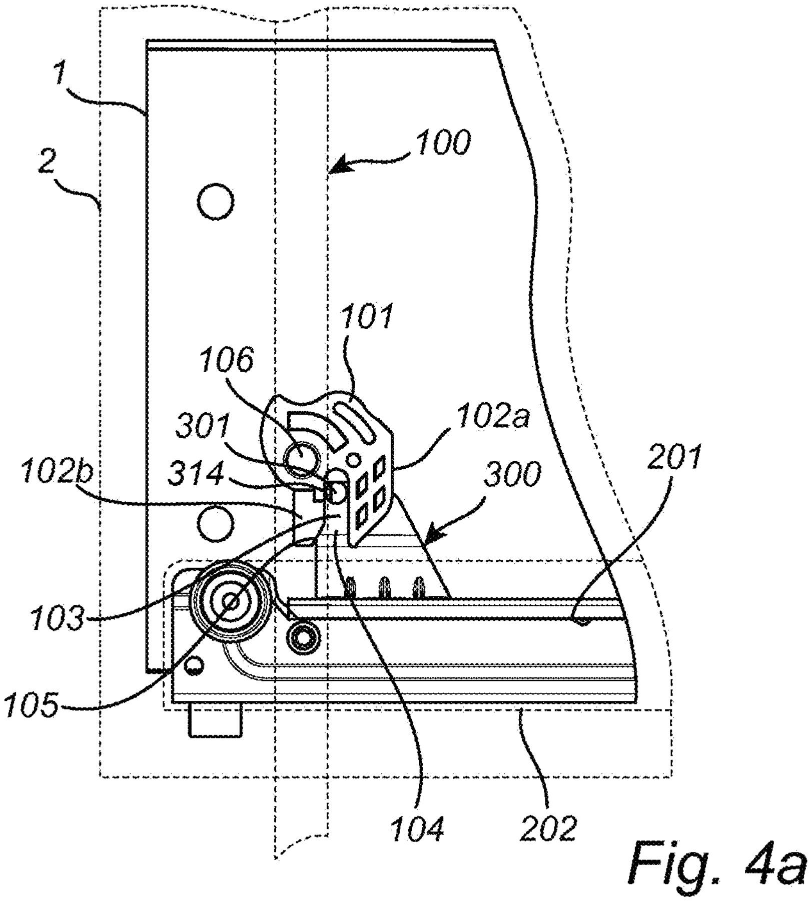
FIG. 4*a* schematically discloses the interaction between the actuator and a drawer locker arrangement in a locked position where the drawer is set to a closed position.
Figure 4B:
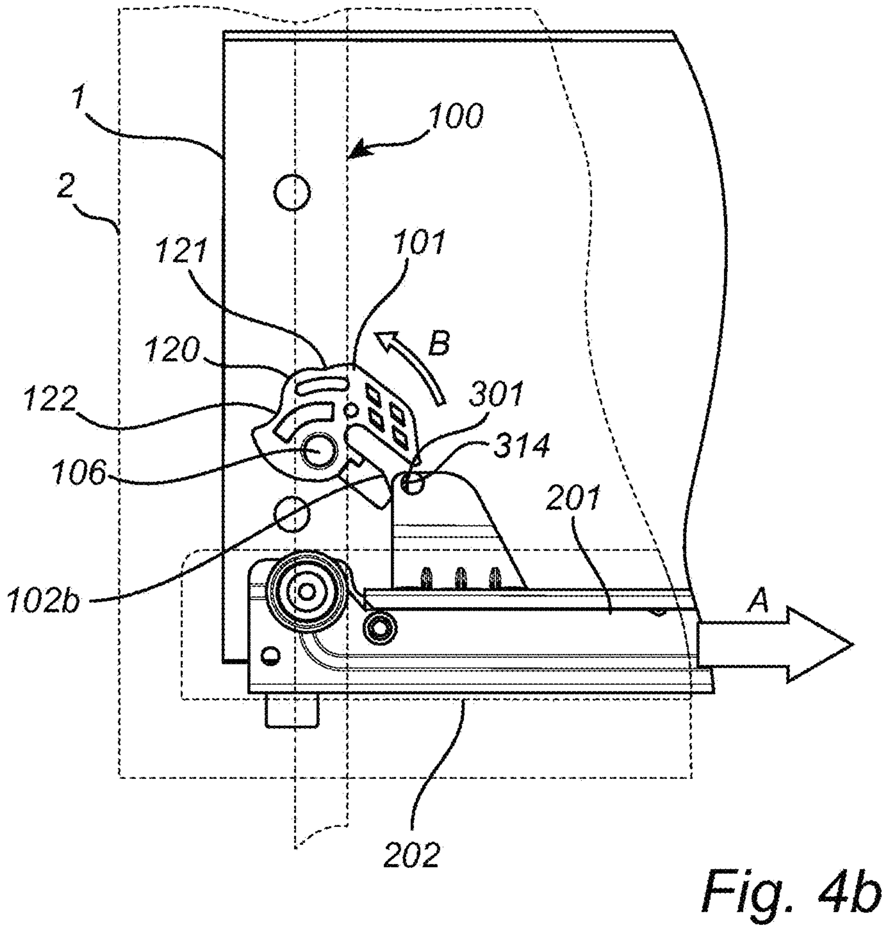
FIG. 4*b* schematically discloses the interaction between the actuator and a drawer locker arrangement in an unlocked position where the drawer has been pulled out partially.

Now turning to FIGS. 4*a* and 4*b*, the interaction between the actuator 300 of a drawer 1 and the drawer locker arrangement 100 is disclosed. FIG. 4*a* discloses the drawer 1 when fully inserted into the highly schematically disclosed cabinet 2. FIG. 4*b* discloses the drawer 1 when the opening thereof has been initiated by pulling the same outwardly, see arrow A. To facilitate understanding, only the rear end of the drawer 1 is disclosed. Further, only the locking member 101 of the drawer locking arrangement 100 is disclosed.

The locking member 101 of the drawer locking arrangement comprises two fingers 102*a*, 102*b* which define an intermediary gap 103 having an open mouth 104. The gap 103 is configured to receive the driver 301 of the actuator 300.

The locking member 101 is pivotably supported by a pivot 106.

Starting with FIG. 4*a*, the drawer 1 is in its fully closed position. The driver 301 is received in the gap 103 between the two fingers 102*a*, 102*b*. As the drawer 1 is pulled to open the same, see arrow A in FIG. 4*b*, the driver 301 forces the locking member 101 to pivot, see arrow B, around the pivot 106 thereby allowing the driver 301 to pass through the open mouth 104 of the gap 103. The actuator 300 is moved in view of the drawer locker arrangement 100 since it is supported by the drawer rail 201 which in turn is moved in view of the guide rail 202 which, like the drawer locker arrangement 100 is fixedly attached to the inner side wall of the cabinet 2.

When pushing the drawer 1 to a closed position (in the direction opposite to arrow A in FIG. 4*b*), the driver 301 will contact the rear finger 102*b* of the locking member 101 and hence force the locking member 101 to pivot in the direction opposite to arrow B, resulting in the position which is disclosed in FIG. 4*a*.

The free end portion of the driver 301 may comprise the optional bevelled edge portion 314 facing the rear wall of the cabinet 2. Depending on the design of the drawer locking arrangement 100, the bevelled edge 314 may facilitate the initial insertion of the drawer 1 in the event the pivotable locking member 301 of the drawer locking arrangement 100 should have been pivoted into the position in which it during normal operation is intended to lockingly engage the driver 301 of the actuator 300.

Turning to FIG. 4*b*, an upper edge portion of the locking member 101 comprises a cam surface 120 with a first cam portion 121 and a second cam portion 122. The function of these cam portions 121, 122 will be further described below with reference to FIGS. 5*a* and 5*b*.

Now turning to FIGS. 5*a*-5*b*, the operation of the locking arrangement 1000 according to the invention will be discussed as applied to one specific embodiment of a drawer locking arrangement 100. The locking arrangement 100 is disclosed as being supported by one of the two opposing side walls 7 of a highly schematically disclosed cabinet 2. To facilitate understanding, only a portion of the rear wall 6 and one of the two opposing side walls 7 of the cabinet 2 are disclosed. Also, only a portion of a single drawer 1 is disclosed.

The disclosed drawer locking arrangement 100 is as such a well-known arrangement in the furniture industry and is described in detail in e.g. U.S. Pat. No. 4,768,844 which is included by reference. The drawer locking arrangement 100 as described in said patent is developed to allow only one drawer at a time to be opened. Also, the drawer locking arrangement 100 is designed to be fixedly mounted to one of the two opposing side walls 7 of the cabinet 2.

The drawer locking arrangement 100 comprises a longitudinally extending locking rail 110. The locking rail 110 is preferably arranged to have a vertical extension. The locking rail 110 is preferrable partly or fully received in a longitudinally extending groove 8 in the side wall 7 of the cabinet 2. Alternatively, the locking rail 110 may be arranged on the surface of the side wall 7 of the cabinet 2.

In the following the general working principle of the drawer locking arrangement 100 as such will be described.

The locking rail 110 comprises a stop member 111 which is arranged in an upper end portion of the locking rail 110. The stop member 111 supports a compressible spring 112. The spring 112 is compressible in view of the stop member 111 a pre-determined distance only. This pre-determined distance is limited to allow only one drawer 1 at a time to be opened. This is illustrated in FIGS. 5*a* and 5*b*, with the distance G1 in FIG. 5*a* being larger than the distance G2 in FIG. 5*b*.

The locking rail 110 further supports one locking member 101 per drawer 1 in the cabinet 2. In the disclosed embodiment, the drawer locking arrangement 100 is configured to be used for a cabinet 2 containing three drawers 1 (only one disclosed), and hence the locking rail 110 supports three locking members 101. Note that the lower most locking member is arranged below the drawer 1 and is hence not visible in the present view. Each locking member 101 is pivotable supported by the drawer locking arrangement by means of a pivot 106.

As discussed above with reference to FIG. 4*a*, each locking member 101 comprises two fingers 102*a*, 102*b* which between them define a gap 103. The gap 103 is configured to receive the driver 301 of the actuator 300. The driver 301 and its position is an important part of the present invention and is hence not known or obvious in the light of the disclosure in U.S. Pat. No. 4,768,844. As previously discussed, the driver 301 is according to the present invention part of the actuator 300 which is supported by the drawer rail 201 of the associated drawer 1. In a position when the drawer 1 is closed, the driver 301 will be received in said gap 103.

Further, as previously discussed with reference to FIG. 4*b*, the upper edge portion of the locking member comprises a first cam portion 121 and a second cam portion 122. The two cam portions 121, 122 are configured to interact with a cam shaped pusher 130 which will be described below.

Figure 5A:
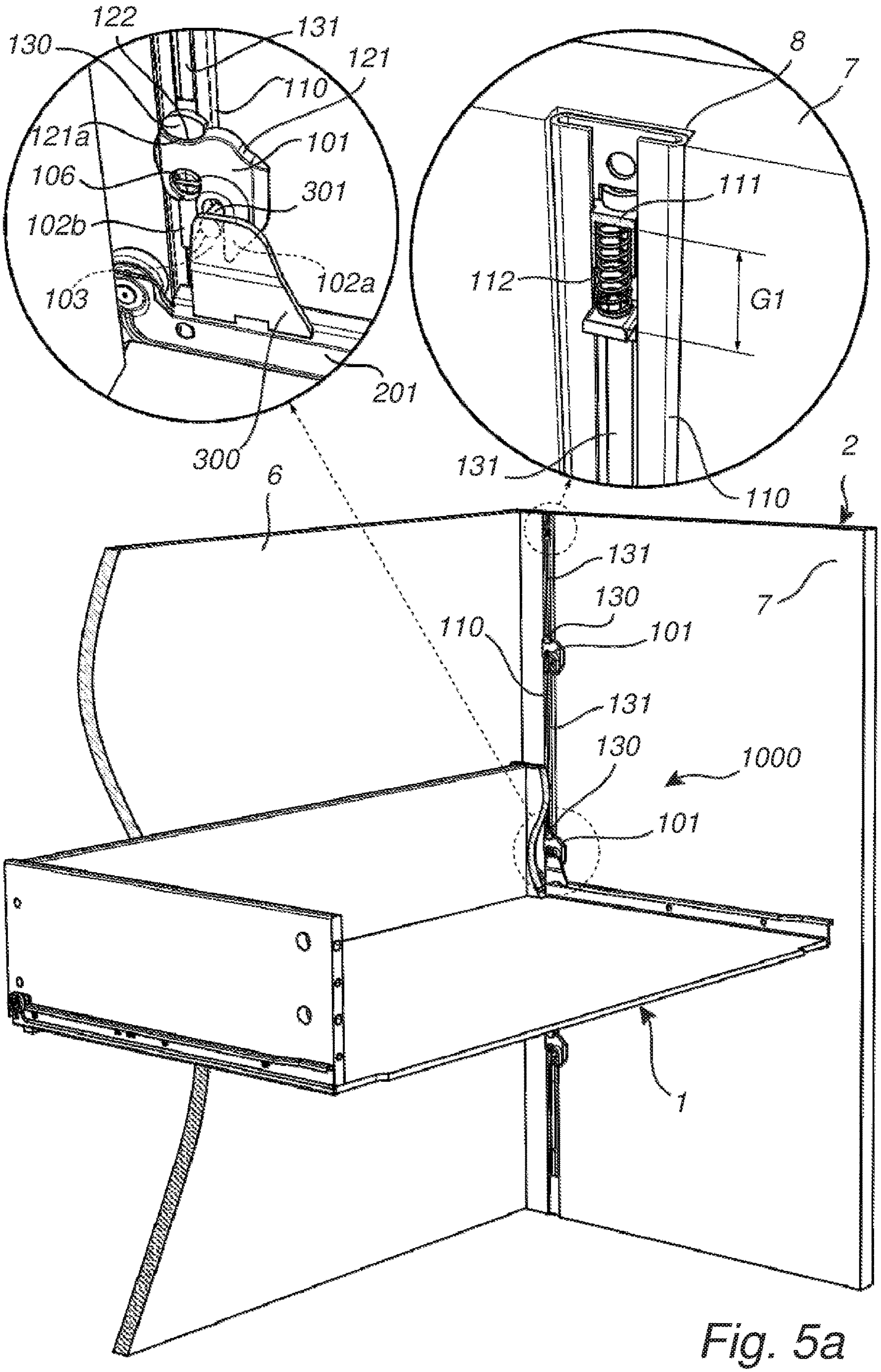
FIG. 5*a* schematically discloses a cabinet with a drawer and a drawer locking arrangement in a locked position.
Figure 5B:
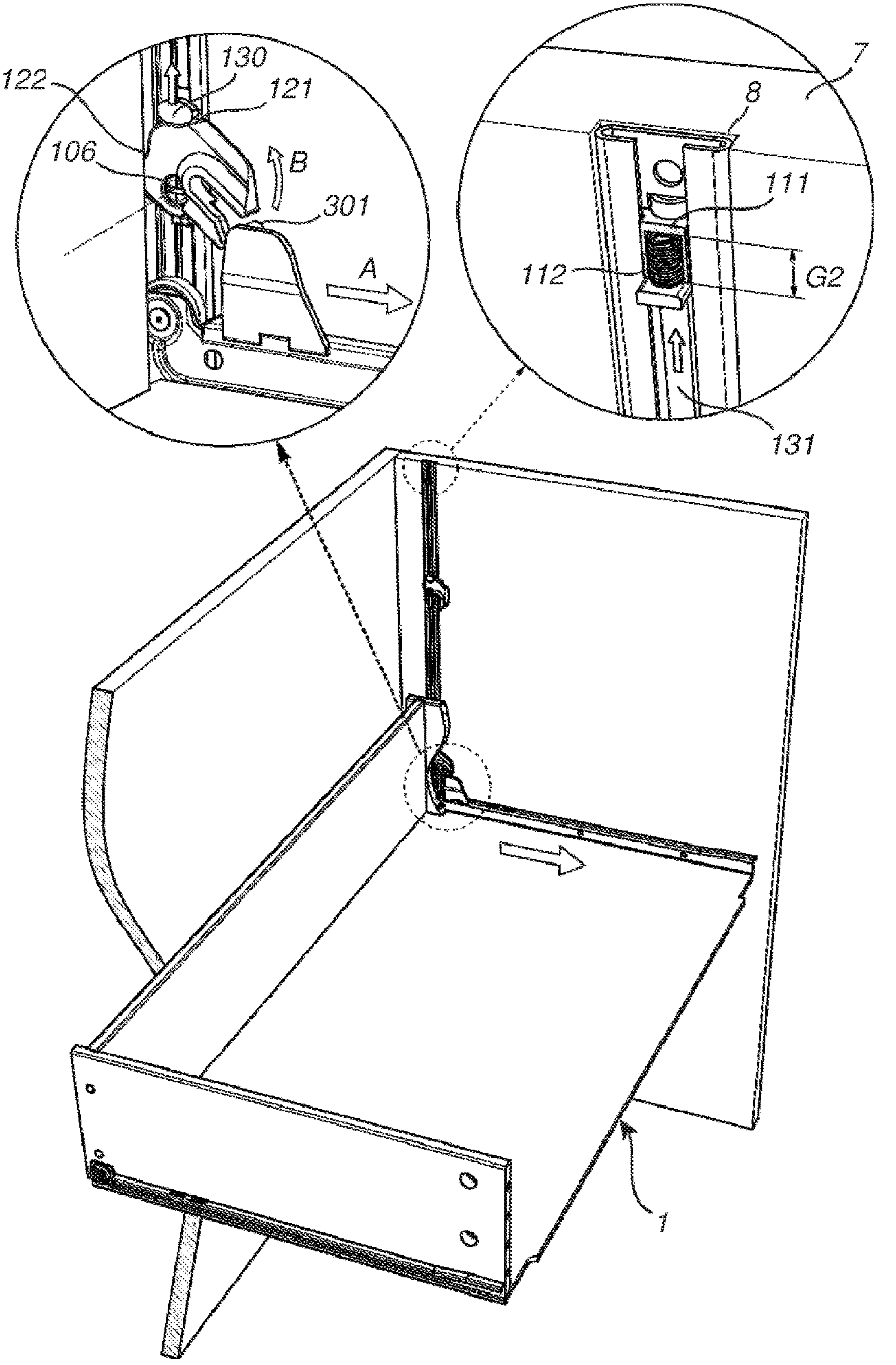
FIG. 5*b* schematically discloses a cabinet with a drawer and a drawer locking arrangement where the drawer is partially pulled out.

In a condition when the drawer is closed and the driver 301 is received in the gap 103 between the two fingers 102*a*, 102*b*, see FIG. 5*a*, the pusher 130 engages the first cam portion 122. When pulling the drawer 1 to open the same, see FIG. 5*b* and arrow A, the driver 301 will cause the locking member 101 to pivot, see arrow B around its pivot 106, whereby the engagement between the driver 301 and the fingers 102*a*, 102*b* will be released, thereby allowing the drawer 1 to be pulled out. In this position and as a result of the pivoting, the pusher 130 instead engages the second cam portion 121.

As the pusher 130 moves from engaging the first cam portion 122 to engaging the second cam portion 121 it is displaced along the longitudinal extension of the locking rail 110. This will be described below with reference to FIGS. 5*a* and 5*b*.

As given above, the two cam portions 121 and 122 are configured to interact with the pusher 130. Also, each locking member 101 is associated with one pusher 130. In the disclosed embodiment, the upper most pusher 130 is arranged to interact, directly or indirectly with the spring 112 of the stop member 111, whereas the two subsequent pushers 130 are each indirectly interacting with spring 112 of the stop member 111 via locking rods 131 which are slidingly received in the locking rail 110. Thus, when pivoting any of the locking members 101 positioned below the upper most locking member 101, the locking rod or rods 131 of the one or more locking members 101 above the pivoted locking member 101, will be pushed upwardly to thereby act on the spring 112 thereby compressing the same. As a result of the cam mechanism between the respective pusher 130 and the two cam portions 121 and 122 of the respective locking member 101, the total compression length of the spring 112 of the stop member 111 will be the same no matter which locking member 101 is pivoted. By the limited allowed compression of the spring 112 allowed by the position of the stop member 111, only one drawer at the time is allowed to be opened. Thus, the disclosed embodiment of the drawer locking arrangement 100 allows only one drawer to be opened at the same time. The user is however free to select which drawer.

Figure 6:
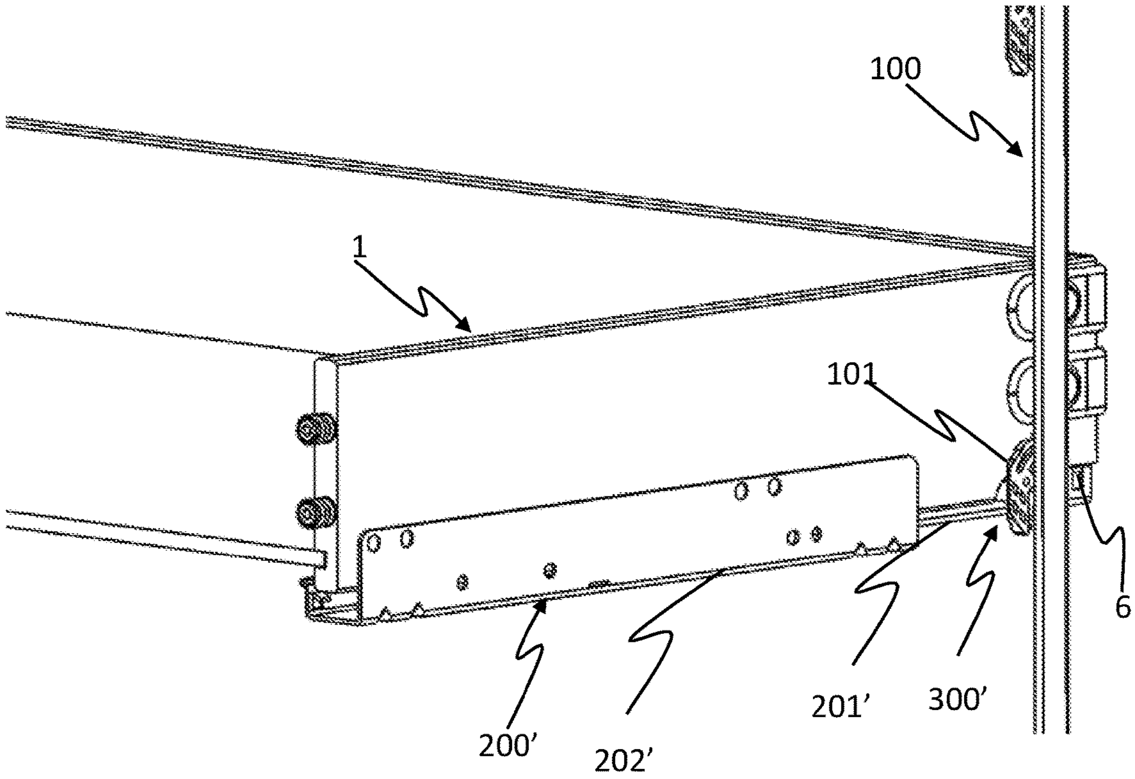
FIG. 6 is a perspective view of an alternative embodiment of the actuator and the drawer support arrangement respectively together with the previously disclosed drawer locking arrangement.

Now turning to FIG. 6, a schematic perspective view of an alternative embodiment of an actuator 300' and a drawer support arrangement 200' respectively is disclosed as mounted to a drawer 1 and interacting with a drawer locking arrangement 100 of the same type that has been discussed above. To facilitate understanding, only a portion of the drawer 1 and the drawer locking arrangement 100 is disclosed. Also, the cabinet with its walls is omitted.

The alternative embodiment of the drawer support arrangement 200' comprises a drawer rail 201' which is mounted to a lower edge of the drawer 1 and which is at least partially received in a recess 6 in the side wall of the drawer 1. The drawer rail 201' supports an actuator 300' in its rear end which interacts with an associated locking member 101 of the drawer locking arrangement 100.

The drawer rail 201' slidingly engages a guide rail 202', both of them forming part of the drawer support arrangement 200'. The guide rail 202' is configured to be fixedly mounted to a non-disclosed side wall of the cabinet.

Figure 7:
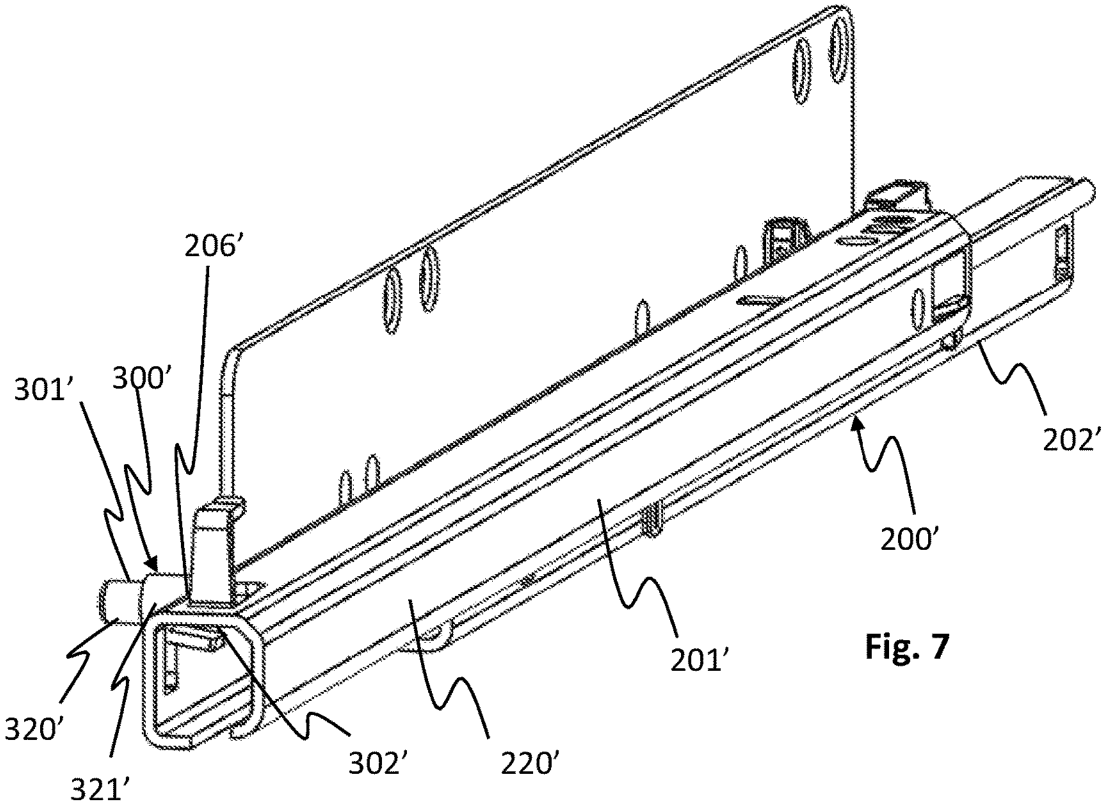
FIG. 7 is a first perspective view of the alternative embodiment of the actuator and the drawer rail respectively.

Turning to FIG. 7, a first perspective view of the drawer support arrangement 200' with the actuator 300' is disclosed as seen from a rear end of the drawer rail 201' and from the side intended to face the drawer (not disclosed).

The drawer rail 201' is formed by an extruded or pressed hollow profile 220' which in its interior supports the body 302' of the actuator 300'. The skilled person realizes that the body 302' may have numerous designs within the scope of the invention. The actuator 300' comprises a driver 301' which projects to the exterior side of the drawer rail 201' via a hole 206' in the drawer rail 201'. The driver 301' is elastically biased in its axial direction. The biasing is provided for by the driver 301' comprising a pin 320' which is received in a tubular base portion 321'. The pin 320' is biased in a direction away from the drawer rail 201' by a non-disclosed elastic member, such as a spring, which is received in the tubular base portion 321'. It is to be understood that the biasing may be provided for in a number of ways. Also, the skilled person realizes that the biasing may be omitted, whereby the driver will be rigid in the axial direction thereof.

Figure 8:
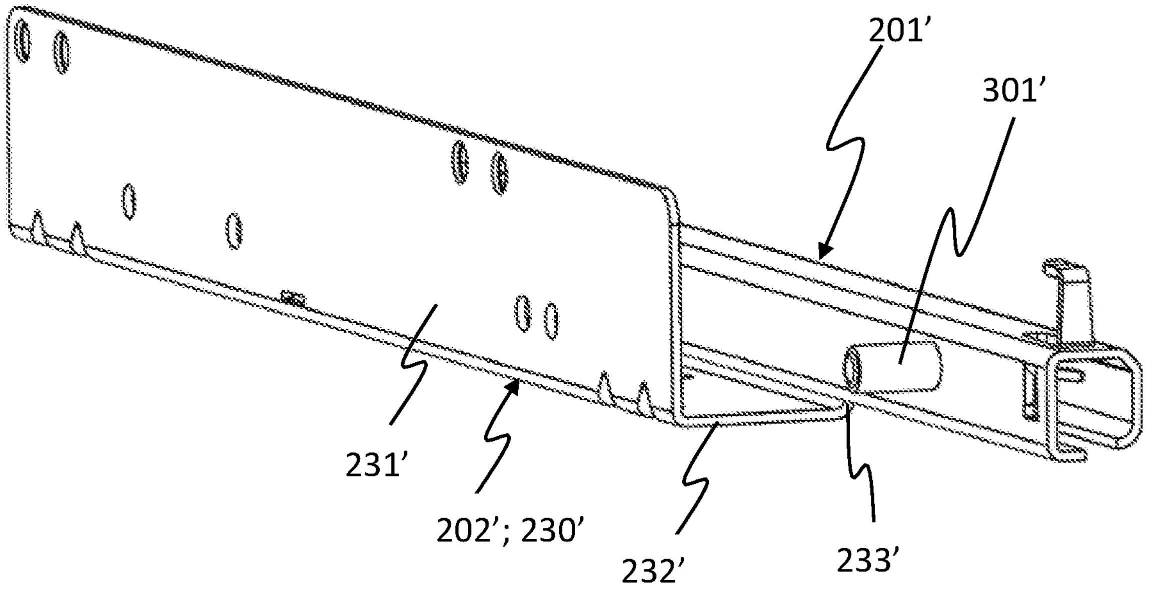
FIG. 8 discloses a second perspective view of the alternative embodiment of the actuator and the drawer rail respectively.

Now turning to FIG. 8, a second perspective view of the drawer support arrangement 200' and the actuator 300' is disclosed as seen from a rear end of the drawer rail 201' and from the side intended to face the side wall of the cabinet (not disclosed).

The guide rail 202' comprises a substantially U-shaped profile 230' with one longitudinally extending first flange 231' which is provided for mounting the guide rail 202' to an inner wall of the cabinet (not disclosed), a web 232' and a second flange 233' which slidingly engages the interior of the hollow drawer rail 201'. It is to be understood that the guide rail 202' and the drawer rail 201' with remained function may be designed in a number of ways within the scope of the invention.

The overall design in FIG. 8 is the same as that previously discussed above with reference to FIGS. 6 and 7. The difference is that the driver 301' is illustrated as being set to a position in which it is pushed inwardly, i.e. the non-disclosed elastic member has been compressed.

The purpose of the biasing is to facilitate initial insertion of a drawer in the cabinet even though the associated locking member 101' should be set to a position in which it during normal operation is intended to lockingly engage the driver 301' of the actuator 300'. This is best illustrated in FIG. 4*a*. Although the body of the actuator 300 in FIG. 4*a* has a different design the principle is the same. When the drawer 1 is pushed into the cabinet 2, the driver 301; 301' will be forced past the first finger 102*a* of the locking member 101. During this passage, the axial length of the driver 301' will be temporarily reduced as a consequence of the compression of the elastic member. The very same effect is achieved in the first embodiment of the actuator 300 disclosed in FIG. 4*a* where the body 302 of the actuator 300 comprises an angle α and where the body 302 as a result of its thin-walled structure has an inherent flexibility. As the driver 301; 301' has passed the finger 102*b* and engages the gap 103 between the two fingers 102*a*, 102*b*, the compression will release and the driver 300; 301' will automatically return to the position disclosed in FIG. 7. Thus, by biasing the driver 301', or the inherent flexibility of the body 302, any misalignment of the locking members 101 in the drawer locking arrangement 100 may be overruled during the initial insertion of the drawers when installing the cabinet.

Thus, in summary, the present invention resides in the idea of operating a drawer locking arrangement which as such is well known in the furniture industry by providing an actuator with a driver which actuator is supported by the drawer rail of the associated drawer.

By arranging the actuator and its driver to be supported by the drawer rail, a number of advantages are provided.

The locking arrangement has a simple and highly intuitive design which ensures that the locking arrangement is automatically working in a correct manner immediately when the one or more drawers are inserted in the cabinet during installation.

Since the actuator with its driver is supported by the drawer rail of the associated drawer, the actuator may be provided as an integral part of the drawer rail. This ensures that the actuator will be automatically and correctly mounted together with the drawer rail.

The drawer rail, and hence the actuator may be provided as a component which is pre-mounted to the drawer.

In the event the cabinet and its drawers is of the type which is provided as one or more flat packages with parts to be assembled by the user, the wall parts of the drawers may all be provided in one or more flat packages since the actuator with its driver is not part of the drawer but instead part of the drawer rail. This allows a reduced amount of packaging material and transport volume.

By the actuator being supported by the drawer rail, it is made possible to reduce the number of parts and hence part numbers in a business system. This reduces cost and facilitates the logistic chain from design, manufacturing, stock keeping, packing and assembly.

Although the invention has been described above in the light of one exemplified drawer locking arrangement, it is to be understood that the invention resides in the idea of arranging the actuator to be supported by the drawer rail of the drawer. Thus, the invention is applicable to other types of drawer locking arrangements than the one specifically exemplified. One such alternative arrangement is that disclosed in U.S. Pat. No. 5,671,985.

The locking member has been disclosed as being pivotable around a pivot. The skilled person realizes that the same principle may be achieved by instead using a hinge or sliding members.

The drawer support arrangement has been exemplified as being based on wheels to reduce friction between the drawer rail and the guiding rail. The invention is equally applicable to drawer support arrangement with rails using other types of friction members, such as rollers, balls or even a low-friction material such as a polymeric material.

The guiding rail which forms part of the drawer support arrangement may be arranged on top of and across the locking rail of the drawer locking arrangement.

Although not explicitly disclosed, it is to be understood that each drawer of the cabinet is supported by guiding and support rails which are arranged in the opposing side walls of the chest of drawers. At least one of said guiding rails may be arranged on top of and across the locking rail of the drawer locking arrangement. Thereby a robust mounting of the drawer locking arrangement is provided for. Also, this makes it more difficult for the user of the cabinet to actively on her own volition remove the drawer locking arrangement.

In the event of the cabinet is configured to be assembled by the user, one of the two opposing side walls of the cabinet may be supplied with the drawer locking arrangement pre-mounted to the side wall portion.

It is sufficient that only one side wall of the cabinet is provided with a drawer locking arrangement.

The invention claimed is:

1. A locking arrangement for a plurality of drawers in a cabinet, the locking arrangement comprising (i) a drawer support arrangement, (ii) a drawer locking arrangement, and (iii) an actuator, wherein:

the drawer support arrangement includes a drawer rail adapted to be attached to an associated drawer of the plurality of drawers and a guiding rail adapted to be attached to the cabinet, the drawer rail movably received in the guiding rail for moving the associated drawer into and out of the cabinet;

the drawer locking arrangement includes a plurality of locking members each configured to engage a respective drawer of the plurality of drawers, the plurality of locking members interconnected to each other and configured to selectively allow only one drawer of the plurality of drawers to be opened at a time;

the actuator includes a driver configured to interact with an associated locking member of the plurality of locking members that is associated with the associated drawer;

the actuator is supported by the drawer rail; and the driver is elastically biased away from the drawer rail.

2. The locking arrangement according to claim 1, wherein the actuator is attached to the drawer rail.

3. The locking arrangement according to claim 1, wherein the plurality of locking members are pivotable.

4. The locking arrangement according to claim 1, wherein the actuator is arranged on an inner side of the drawer rail, and wherein the inner side of the drawer rail is adapted to face toward an outer side wall portion of the associated drawer.

5. The locking arrangement according to claim 1, wherein the actuator is a body having:

a first portion configured to abut an outer side wall portion of the associated drawer; and a second portion configured to form an angle α to the outer side wall portion of the associated drawer.

6. The locking arrangement according to claim 5, wherein the driver is supported by the second portion of the actuator.

7. The locking arrangement according to claim 1, wherein the driver is displaced in view of a longitudinal centre line of the actuator.

8. The locking arrangement according to claim 1, wherein a free end portion of the driver has a bevelled edge portion configured to face a rear wall of the cabinet.

9. The locking arrangement according to claim 1, wherein:

the actuator includes a body adapted for arrangement (i) between the associated drawer and at least a portion of the drawer rail or (ii) inside the drawer rail; and the driver has an axial extension allowing a free end of the driver to extend through a hole disposed in the drawer rail and into engagement with the associated locking member of the drawer locking arrangement.

10. The locking arrangement according to claim 1, wherein the drawer locking arrangement further includes:

a locking rail mountable to an inner side wall portion of the cabinet, the locking rail configured to receive a plurality of locking rods, and to allow displacement of the plurality of locking rods along a longitudinal extension of the locking rail based on a setting of a locking member of the plurality of locking members; and a stop member configured to restrict displacement of the plurality of locking rods whereby only one drawer is openable at a time.

11. The locking arrangement according to claim 10, wherein:

the drawer support arrangement further includes another drawer rail and another guiding rail, the drawer rail and the guiding rail defining a first rail pair of two rail pairs, and the another drawer rail and the another guiding rail defining a second rail pair of the two rail pairs;

the two rail pairs are adapted to be arranged on opposing side walls of the cabinet and to support the associated drawer; and one of the two rail pairs is arranged on top of and across the locking rail of the drawer locking arrangement.

12. A cabinet, comprising a locking arrangement according to claim 1.

13. The locking arrangement according to claim 1, wherein the actuator is a body having:

a first portion attached to the drawer rail; and a second portion projecting transversely from the first portion.

14. The locking arrangement according to claim 13, wherein the second portion of the actuator projects from an end of the first portion of the actuator disposed opposite the drawer rail.

15. The locking arrangement according to claim 13, wherein the driver is disposed on and projects from the second portion of the actuator in a direction perpendicular to the first portion of the actuator.

16. The locking arrangement according to claim 1, wherein:

the actuator includes i) a body and ii) a tubular base portion; and the driver is an elastically biased pin adjustably arranged at least partially in the tubular base portion.

17. The locking arrangement according to claim 16, wherein the actuator further includes an elastic biasing member arranged in the tubular base portion and biasing the driver in a direction away from the drawer rail.

18. A locking arrangement for a plurality of drawers arranged in a cabinet, the locking arrangement comprising (i) a drawer support arrangement, (ii) a drawer locking arrangement, and (iii) an actuator, wherein:

the drawer locking arrangement includes a plurality of pivotable and interconnected locking members that are each configured to engage a respective drawer of the plurality of drawers, the plurality of locking members adapted to selectively allow only one drawer of the plurality of drawers to be opened at a time;

the drawer support arrangement, the actuator, and a locking member of the plurality of locking members are configured to be associated with an associated drawer of the plurality of drawers;

the drawer support arrangement includes a drawer rail adapted to be attached to an associated drawer of the plurality of drawers and a guiding rail adapted to be attached to the cabinet, the drawer rail movably received in the guiding rail for moving the associated drawer into and out of the cabinet;

the actuator includes a driver configured to interact with a locking member of the plurality of locking members;

the actuator is attached to and supported by the drawer rail; and a free end of the driver is engageable with the locking member via a hole disposed in the drawer rail.

19. The locking arrangement according to claim 18, wherein the free end of the driver includes a bevelled edge configured to face a rear wall of the cabinet.

* * * * *